United States Patent [19]

Keeling et al.

[11] 3,970,247
[45] July 20, 1976

[54] CONSERVATION OF ENERGY HEATER

[76] Inventors: Boyd E. Keeling, P.O. Box 4-1059, Anchorage, Alaska 99509; Harold R. Hawkins, 6675 Holly Lane, Anchorage, Alaska 99502

[22] Filed: Nov. 7, 1974

[21] Appl. No.: 521,555

[52] U.S. Cl. .......................................... 237/12.3 B
[51] Int. Cl.² ........................................... B60H 1/02
[58] Field of Search ................. 237/12.3 C, 12.3 R, 237/12.3 B; 165/164

[56] References Cited
UNITED STATES PATENTS

| | | | |
|---|---|---|---|
| 1,809,654 | 6/1931 | Wagnel | 165/164 X |
| 2,131,635 | 9/1938 | Mullen | 237/12.3 B |
| 2,501,512 | 3/1950 | Hausladen | 237/12.3 B |
| 2,621,857 | 12/1952 | Wixon | 237/12.3 B |
| 2,654,826 | 10/1953 | Spurlin | 237/12.3 B X |
| 3,357,413 | 12/1967 | Quinton | 237/12.3 B X |
| 3,758,031 | 9/1973 | Moran | 237/12.3 C X |
| 3,777,975 | 12/1973 | Kofink | 237/12.3 C X |
| 3,877,639 | 4/1975 | Wilson et al. | 237/12.3 C |

*Primary Examiner*—William E. Wayner
*Assistant Examiner*—William E. Tapolcai, Jr.
*Attorney, Agent, or Firm*—Poms, Smith, Lande & Glenny

[57] ABSTRACT

An auxiliary air preheater means is for use in prewarming interiors of vehicles having engine preheating means employing a heated fluid for prewarming the engine prior to operation of the vehicle engine and the vehicle heater normally associated with the vehicle engine and includes an insulated housing surrounding a section of conduit employed for conveying heated fluid employed in the engine preheating operation. Air is circulated through the housing in contact with the heated fluid conduit and is blown into the vehicle compartment. Air may be returned from the vehicle compartment through the auxiliary air preheater housing for recirculation through the passenger compartment.

4 Claims, 4 Drawing Figures

CONSERVATION OF ENERGY HEATER

BACKGROUND OF THE INVENTION

Generally stated, the present invention relates to means for prewarming the passenger compartment of a vehicle prior to operation of the vehicle engine through the use of heat available from vehicle engine preheating means. More specifically, the present invention relates to an auxiliary air preheater means for use in prewarming interiors of vehicles having engine preheating means employing a heated fluid for prewarming the vehicle engine prior to operation of either the vehicle engine or the vehicle heater operated off of engine heat.

In many areas of the world, climatic conditions are such that when motor driven vehicles, such as automobiles, air planes, boats, trucks, off road equipment and the like are not operated during an overnight period of time, the engine must be preheated before it may be operated. Engine preheaters for preheating the engine prior to its operation are generally well known in the art and include various types of head bolt heaters, crank case oil heaters, circulating heaters and tank heaters. In many of such engine heating devices, a warm fluid is circulated through a heater, gas or electrically operated, and a jacket positioned about the engine block or crank case, or may even be circulated through the radiator system of the vehicle engine. Since these engine preheaters are operated before the engine of the vehicle is started, it has been common practice heretofore to also then operate the vehicle engine for a period of time in order to warm up the interior of the vehicle, i.e. passenger compartment, in order to defrost window areas and provide a comfortable environment for passengers. Such operation of the vehicle engine in order to run the commonly provided vehicle interior heater operating off of engine heat, or the vehicle electrical system, is considered to be wasteful of energy and a contributor to the pollutant of our environment.

It is therefore an object of the present invention to disclose and provide an auxiliary air preheater means for use in prewarming a vehicle passenger compartment at the same time the vehicle engine is being preheated prior to when the vehicle engine is operated and prior to when a vehicle engine associated passenger compartment heater is operated.

It is a further object of the present invention to disclose and provide an auxiliary air preheater means as in the foregoing object wherein the heat source utilized for preheating the engine may be employed for heating air to be circulated between the auxiliary air preheater means and vehicle passenger compartment, to provide for the introduction of fresh air into such circulating system and to conserve heat which might otherwise be dissipated into the atmosphere during preheating of the vehicle engine.

These objects as well as others, and various advantages of the within invention, will become readily understood by those skilled in the art from a consideration of the detailed description of a preferred exemplary embodiment thereof set forth hereinafter.

SUMMARY OF THE INVENTION

The auxiliary air preheater means of the present invention is for use in prewarming interiors of vehicles having engine preheating means employing a heated fluid for prewarming the engine prior to operation of the vehicle engine and engine associated vehicle heaters normally provided in the vehicle and in general includes the provision of a housing surrounding a conduit means through which heated fluid for the engine preheating means is passed. The housing is provided with an air inlet, air outlet and means for connecting the outlet to the interior or passenger compartment of the vehicle. Air blower means are provided in association with the housing for moving air through the housing, in heat transfer relation to the conduit means containing the heated fluid, and through the connecting means conduit to the interior of the vehicle.

More specifically, the air inlet means may be connected to the interior of the vehicle for recirculating air between the auxiliary air preheater means and the vehicle interior. Fresh air inlets may also be provided on the auxiliary air preheater means for introducing fresh air into the circulating air system. Heat transfer between the heated fluid conduit of the engine preheating means and the air being circulated through the vehicle passenger compartment may be enhanced through the provision of the air preheater means conduit means in coiled configuration. Such coiled portion of the conduit means may be provided with fins to increase surface area contact with the air passing thereby. Further, additional heat conductive means such as shredded copper material may be placed within the housing in contact with the conduit means coil for increasing heat transfer to the air moved through the housing by the air blower means.

DESCRIPTION OF THE PREFERRED EMBODIMENT

Figure 1:
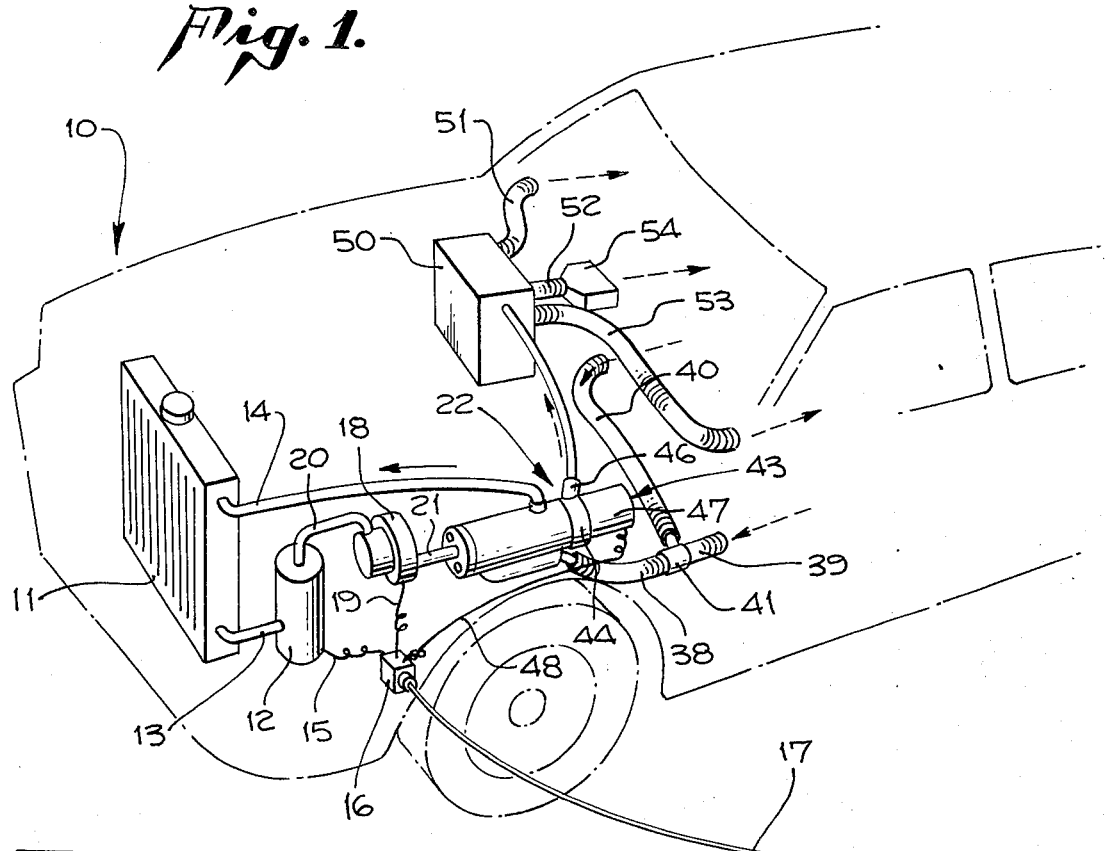
FIG. 1 is a perspective view of a preferred exemplary embodiment of auxiliary air preheater means for use in prewarming interiors of vehicles, according to the present invention, shown operably associated with vehicle engine preheating means employing a heated fluid for prewarming the engine of a vehicle shown somewhat schematically.

Referring to FIG. 1, a vehicle is somewhat schematically represented generally at 10 having a radiator 11 associated with a conventional vehicle engine (not shown). A tank type heater 12, also known in the prior art, is provided for prewarming the radiator fluid which may be circulated through the heater 12 via lines 13 and 14 in known manner. This method of engine preheating is exemplary only, it being contemplated that any type of engine preheater means may be employed as long as a heated fluid is employed in prewarming the engine. Tank heater 12 may be gas fired or electrically operated, as in the within illustration, via electrical wiring 15 connected to socket 16 which in turn may be connected to a source of electricity via extension cord 17.

When tank heater 12 is operating to warm the radiator fluid, an electrically driven pump 18 may also be concurrently operated for causing fluid flow. As illustrated in FIG. 1, pump 18 is electrically operated, having electrical wiring 19 connected to socket 16 to operate an associated electric motor in pump 18 when the extension cord 17 is connected to an electrical source. An appropriate conduit 20 is provided for connecting radiator outlet line 13 through tank heater 12 to pump 18. Normally, heretofore, pump 18 would be merely connected directly via line 14 to the radiator 11. In accordance with the present invention, outlet conduit or line 21 from pump 18 is passed through the auxiliary air preheater means, indicated generally at 22.

Figure 2:
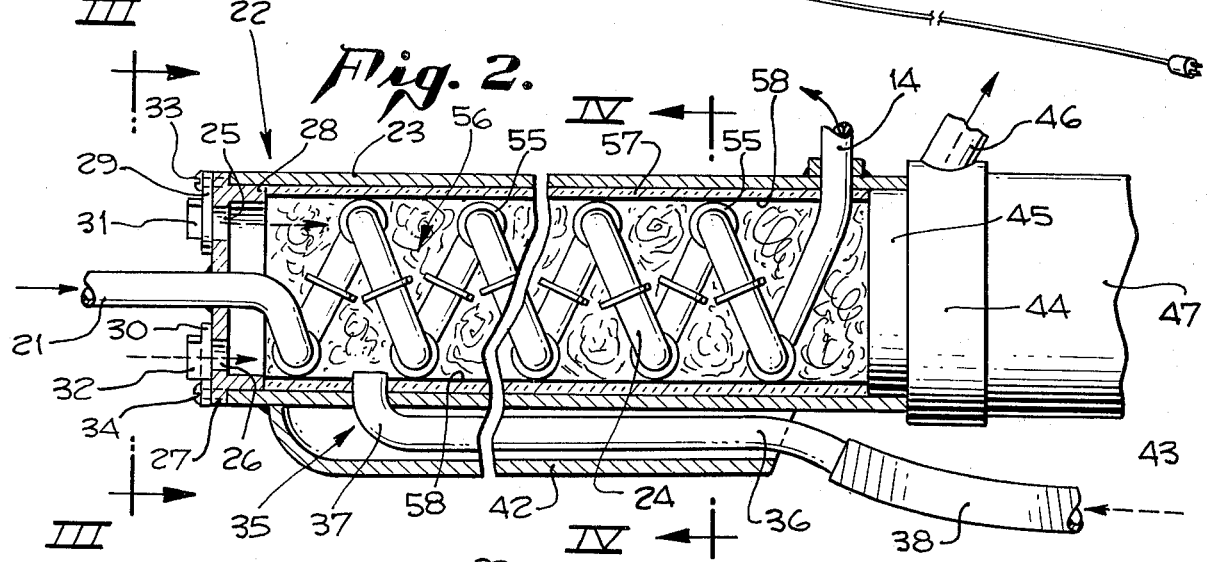
FIG. 2 is a section view of the exemplary auxiliary air preheater means of FIG. 1.

Referring now to FIG. 2, the auxiliary air preheater means, indicated generally at 22, is provided with a housing 23 through which conduit or line 21 passes to interconnect with conduit 14 running to radiator 11. Preferably, the conduit section 24 within housing 23 is of coil configuration in order to prolong the flow of heated radiator fluids from tank 12 within the housing.

As particularly contemplated within the present invention, air is passed in contact with the conduit section 24 within housing 23 to prewarm it, via the heated radiator fluid flowing therein. This warmed air is then circulated through the vehicle interior to prewarm the vehicle interior as the engine is being preheated, prior to starting of the vehicle.

Figure 3:
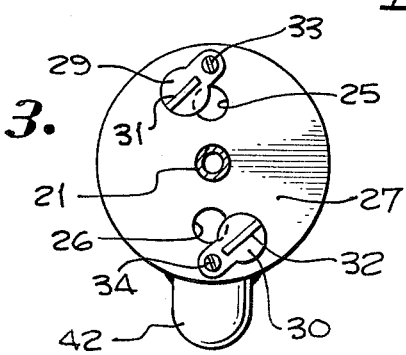
FIG. 3 is an end view of the auxiliary air preheater means of FIG. 2 taken therein along the plane III—III.
Figure 4:
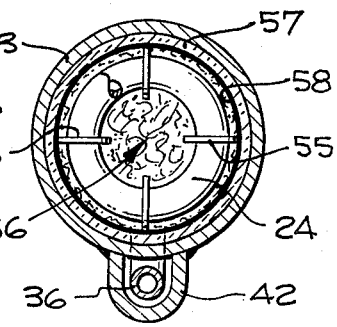
FIG. 4 is a cross sectional view of the auxiliary air preheater means of FIG. 2 taken therein along the plane IV—IV.

A first air inlet means is provided in association with housing 23 to allow introduction of fresh or ambient air. Such first air inlet means, in the exemplary embodiment, comprises the provision of inlet apertures 25 and 26 in the housing end plate 27. As seen in FIG. 2, end plate 27 may have an inwardly extending flange 28 which fits within the tubular or cylindrical housing 23. End plate 27 may be secured to the housing 23 by a press fit, mechanical fasteners, welding or other suitable fastening means. Air flow through inlets 25 and 26 may be adjusted via closure means associated therewith, said closure means comprising the provision of pivotally mounted closure plates 29 and 30 having finger tabs 31 and 32. Closure plates 29 and 30 may be pivotally mounted via fasteners 33 and 34, respectively, to the end plate 27, as best seen in FIGS. 2 and 3.

Second air inlet means, employed for recirculating air from the vehicle compartment through the exemplary preheater means, are indicated generally at 35. Such second air inlet means comprises, in the exemplary embodiment, the air return conduit 36 having one end 37 extending into, and opening into, the interior of housing 23. The opposite end of conduit 36 is connected to a flex hose conduit 38 which is run through the fire wall of the vehicle, between the engine compartment and the passenger compartment, to open at its inlet end 39 to the interior of the passenger compartment. An auxiliary passenger compartment air return flex hose 40 may be provided, as seen in FIG. 1, to facilitate the return of air from the passenger compartment into flex conduit 38 via a three way fitting 41. Housing 23 may be provided with an auxiliary housing 42 surrounding air return line inlet conduit 36.

Air blower means are associated with housing 23 for moving air through the housing. Such air blower means is indicated generally at 43 in FIGS. 1 and 2 and may comprise a conventional air impeller unit 44 having an inlet end 45 and outlet 46. The fan or air impeller conventionally provided within unit 44 is adapted to draw air from within housing 23 and force it out through outlet 46 under the drive of an associated electric motor within the air blower housing 47. Such electric motor may be operated off of the same electrical source as are tank heater 12 and fluid impeller 18 through the provision of appropriate electrical wiring 48 interconnecting such motor with the electrical connector or socket 16.

Air blower means outlet 46, as seen in FIG. 1, is adapted, according to the present invention, to direct warmed air from housing 23 into the interior of the vehicle. As seen in FIG. 1, outlet 46 is connected by a flex hose 49 to a control box or plenum chamber 50. Flex conduits 51, 52 and 53 may be connected to plenum 50 for directing air from box or plenum chamber 50 into the interior of the vehicle. Through the provision of appropriate dampers, and controls therefor, the air distribution from the plenum chamber or control box 50 via each or all of the outlet conduits 51, 52 and 53 may be controlled or adjusted. These conduits may merely open directly into the vehicle, or may have appropriate grill means provided, as represented at 54, for directing air flow into the passenger compartment in known manner. As is illustrated in FIG. 1, the warm air inlet conduits are preferably placed in an upper portion of the vehicle passenger compartment with the air return conduits being located at lower portions of the vehicle compartment to promote warm air flow across the upper portions of the vehicle compartment, warming the window areas and then back along lower floor board portions to the return air conduits back to the preheater means indicated generally at 22.

As can be seen from the foregoing, the auxiliary air preheater means, according to the present invention, provides for the moving of air about conduit section 24, containing a warmed fluid employed for preheating the vehicle engine when it is not operating, to thereby warm the air which is then directed into the vehicle compartment through conduits 49, 51, 52 and 53. Recirculating of this warmed air is accomplished by closing, or modulating, air flow through inlets 25 and 26 in order to draw air through return conduits 38 and 36 under the influence of the air blower means indicated generally at 43.

In order to enhance and promote heat transfer from the heated fluid within conduit section 24 and the air being moved thereby, conduit section 24 may be provided with a plurality of fins in order to increase surface contact therebetween. Only a few such fins 55 are illustrated, for ease of illustration, although it is contemplated that such fins may be provided in greater number and in closer spacing than that illustrated. Further, shredded copper material, indicated generally at 56, may be placed within housing 23 in contact with the conduit section 24. Heat transfer by conduction from conduit 24 to the shredded copper material has been found to be good and, by virtue of the greater surface area exposed to the air flow through housing 23 thus provided, a more rapid air warming result with the exemplary embodiment of auxiliary air preheater means has been attained.

In the exemplary embodiment of auxiliary air preheater means, housing 23 is provided with an inner layer of insulation material 57 which may also be interiorly coated with an aluminum foil reflective sheet 58.

It should be understood by those skilled in the art that the foregoing detailed description of a preferred exemplary embodiment of auxiliary air preheater means, according to the present invention, is exemplary only and that various other modifications, adaptations and equivalent embodiments may be made thereof within the scope of the present invention which is defined by the following claims.

We claim:

1. An auxiliary air preheater means used in prewarming interiors of vehicles in combination with engine preheating means employing a heated liquid for prewarming the engine prior to operation of said vehicle engine and prior to operation of the conventionally provided engine associated vehicle interior heater, said auxiliary air preheater means comprising:

housing means mountable to said vehicle separate from said engine associated heater and having air inlet and air outlet means;

liquid conduit means connected to said engine preheating means and passed through said housing for carrying said heated liquid being used for preheating said engine through said housing, said liquid conduit means including a liquid conduit coil within said housing;

means for circulating air from within the interior of said vehicle through said housing about said liquid conduit coil including an air inlet conduit connected between the vehicle interior and said housing inlet means and an air conduit outlet means connecting between said vehicle interior and said housing outlet means; and air blower means associated with said housing for drawing vehicle interior air through said air inlet conduit into said housing through said housing inlet means, for moving said air through said housing in contact with said liquid conduit coil in heat exchange relation to heat said air and then blowing said heated air out said housing outlet means through said air outlet conduit into said vehicle interior, whereby vehicle interior air is constantly recirculated through the housing of said auxiliary air preheater means independently of operation of the vehicle engine and independently of operation of the conventional engine associated vehicle heater.

2. The auxiliary air preheater means of claim 1 wherein:

means are provided for connecting said air blower means to a source of electrical power independently of the vehicle electrical system.

3. The auxiliary air preheater means of claim 1 wherein said engine preheating means is electrically operable and:

electrical means are provided for connecting said electrically operated engine preheating means to a source of electrical power independently of the vehicle battery.

4. The auxiliary air preheater means of claim 1 wherein said engine preheating means includes the provision of an electrically operated liquid pump for moving said heated liquid through said liquid conduit means and:

electrical means are provided for connecting said electrically operated liquid pump to a source of electrical power independently of the vehicle battery.

* * * * *